United States Patent
Yu

(10) Patent No.: US 9,219,373 B2
(45) Date of Patent: Dec. 22, 2015

(54) LOSSLESS CHARGER

(76) Inventor: Baichou Yu, Wuhan (CN)

(*) Notice: Subject to any disclaimer, the term of this patent is extended or adjusted under 35 U.S.C. 154(b) by 357 days.

(21) Appl. No.: 13/636,107

(22) PCT Filed: May 10, 2011

(86) PCT No.: PCT/CN2011/073875
§ 371 (c)(1),
(2), (4) Date: Oct. 23, 2012

(87) PCT Pub. No.: WO2011/144007
PCT Pub. Date: Nov. 24, 2011

(65) Prior Publication Data
US 2013/0033225 A1    Feb. 7, 2013

(30) Foreign Application Priority Data
May 18, 2010  (CN) .......................... 2010 1 0174195

(51) Int. Cl.
| | | |
|---|---|---|
| *H02J 7/00* | (2006.01) | |
| *H01M 10/44* | (2006.01) | |
| *B60L 3/00* | (2006.01) | |
| *B60L 3/04* | (2006.01) | |
| *B60L 11/18* | (2006.01) | |
| *H01M 10/0525* | (2010.01) | |

(52) U.S. Cl.
CPC ............. *H02J 7/0057* (2013.01); *B60L 3/0046* (2013.01); *B60L 3/04* (2013.01); *B60L 11/1803* (2013.01); *B60L 11/1805* (2013.01); *B60L 11/1855* (2013.01); *B60L 11/1859* (2013.01); *B60L 11/1866* (2013.01); *B60L 11/1877* (2013.01); *H01M 10/44* (2013.01); *B60L 2240/547* (2013.01); *B60L 2240/549* (2013.01); *H01M 10/0525* (2013.01); *Y02T 10/7005* (2013.01); *Y02T 10/7011* (2013.01); *Y02T 10/7061* (2013.01)

(58) Field of Classification Search
CPC .............................. H02J 7/0057; H01M 10/44
USPC ......................................................... 320/107
See application file for complete search history.

(56) References Cited

U.S. PATENT DOCUMENTS

| | | | | |
|---|---|---|---|---|
| 4,635,229 | A * | 1/1987 | Okumura et al. | 365/185.07 |
| 5,448,154 | A * | 9/1995 | Kanke et al. | 322/28 |
| 5,705,912 | A * | 1/1998 | Ichihara | 320/125 |
| 5,789,900 | A * | 8/1998 | Hasegawa et al. | 320/132 |
| 5,880,575 | A * | 3/1999 | Itou et al. | 320/122 |
| 5,909,103 | A * | 6/1999 | Williams | 320/134 |
| 6,060,185 | A * | 5/2000 | Okutoh | 429/7 |
| 6,812,673 | B2 * | 11/2004 | Fujiwara | 320/136 |
| 6,977,485 | B1 * | 12/2005 | Wei | 320/139 |
| 8,456,135 | B2 * | 6/2013 | Liu | 320/135 |

(Continued)

*Primary Examiner* — M'Baye Diao
(74) *Attorney, Agent, or Firm* — Wayne Edward Ramage; Baker Donelson

(57) ABSTRACT

A lithium ion power battery lossless charger adopts a charging method of overall serial constant-current and monomer parallel constant-voltage to realize lossless charging on lithium ion power batteries. Charging efficiency is close to 100%, and charging and discharging are completely based on the characteristic curve of the battery. All functions of a battery system, a charging system, a discharging system and a maintenance management system are realized only by a simple circuit, and no overcharge, overheating, over discharge, over current or short circuit occurs. The terminal voltages of all monomer batteries are completely equal when charging is finished, and no equalized charging is required.

5 Claims, 12 Drawing Sheets

(56) References Cited

U.S. PATENT DOCUMENTS

| | | | |
|---|---|---|---|
| 8,975,870 B2 * | 3/2015 | Maruyama et al. | 320/118 |
| 2002/0024319 A1 * | 2/2002 | Haraguchi et al. | 320/122 |
| 2009/0058370 A1 * | 3/2009 | Odaohhara | 320/152 |
| 2011/0181233 A1 * | 7/2011 | Mino et al. | 320/101 |

* cited by examiner

LOSSLESS CHARGER

This application is a national stage application of PCT/CN2011/073875, filed May 10, 2011, which claims priority to CN 201010174195.3, filed May 18, 2010, and is entitled to those filing dates for priority.

TECHNICAL FIELD

This invention relates to a lithium ion power battery lossless charger.

BACKGROUND OF THE INVENTION

The lithium ion battery is an ideal power source due to high monomer voltage, small size, light weight, no memory effect, no pollution, small self discharge and long cycle life. In actual use, in order to obtain higher discharge voltage, at least two monomer batteries are generally connected in series to form a battery pack. At present, the lithium ion battery pack has been widely applied to various fields such as notebook computers, electric bicycles, standby power sources, etc. Meanwhile, the lithium ion battery pack is the best power source for electric vehicles in the ascendant.

The requirements of the lithium ion battery for charging and discharging are completely different from reversible electrochemical reaction type batteries such as lead-acid batteries. Because the lithium ion battery packing application technology, the system integration key technology and key part and product researches seriously fall behind the development of the lithium ion battery, the problems of overcharge, over discharge, over temperature and over current occur after battery packing, so that the service life of packed lithium ion batteries is greatly shortened, the safety is greatly reduced, and even terrible accidents such as combustion, explosion, etc. occur. These become main problems restricting the development of the lithium ion battery industry, and also are technical bottlenecks for the development of the current energy saving and new energy source vehicle industry.

Until today, some good achievements about the electric vehicle technology in China have been obtained in the fields of vehicle power batteries, motors, electric drive, etc. Although the vehicle power battery technology is not mature, the development speed is not slower than that of developed countries. When a battery monomer is measured, various displayed indexes basically reach the design requirements. However, when the battery monomers are really integrated into a power assembly or integrated on a complete vehicle, the results are quite different from those obtained in monomer measurement. The vehicle battery assembly is not formed as simple as connecting the monomer batteries in series or in parallel one by one. The integration of dozens of even hundreds of batteries on a vehicle is a high and new technology even around the world and is not as easy as it appears, and not too many units or individuals have the ability to solve the difficulty. The lithium ion battery system mainly comprises a battery system, a charging system, a discharging system and a maintenance management system. The lithium ion battery system is a high technology integration system covering various technical fields and industries.

Traditional Charging Method

1) Serial charging method: At present, the charging of the lithium ion battery pack is generally serial charging, because the serial charging has simple structure, low cost and easiness in realization. However, the monomer lithium ion batteries have difference in capacity, internal resistance, attenuation, self discharge and other properties. 100 lithium ion batteries with 100 Ah discharge capacity are serially connected to form a battery pack. If 99 monomer lithium ion batteries have 80 Ah charges and one monomer lithium ion battery have 100 Ah charges before packing, when the battery pack is used for serial charging, the monomer lithium ion battery with 100 Ah charges is firstly charged fully to achieve overcharge protection voltage. In order to prevent the monomer lithium ion battery from being overcharged, the battery management system will cut off the entire serial charging circuit, so that the rest 99 batteries are not fully charged, and the discharge capacity of the whole battery pack is only 80 Ah. The serial charging has the defects of wasting the capacity of the battery pack due to insufficient battery pack charging or having the risk of battery explosion due to overcharge.

2) Battery management system and charger coordinated and matched serial charging method: The battery management system is most comprehensive equipment for knowing about the properties and the status of the batteries, so that the information of the batteries can be known by the charger in real time by establishing connection between the battery management system and the charger. Some problems occurred during the charging of the batteries can be solved more effectively. However, the charging method still belongs to serial charging, so the charging method carries on all defects of serial charging.

3) Parallel charging method: In order to solve the problems of overcharge and insufficient charging of certain monomer batteries in the battery pack, the parallel charging method is generated. However, the parallel charging method requires multiple low-voltage large-current charging sources to charge each monomer battery, so that the parallel charging method has the defects of high charging source cost, low reliability and low charging efficiency. Assuming that the vehicle adopts a three-phase AC motor and the input DC voltage of an inverter is 288V, power is supplied by a lithium power battery pack including 80 monomer batteries with voltages 3.7V. The parallel charger must comprise 80 completely isolated DC sources with 200 A constant output current and 3.7V constant output voltage. The completely isolated constant-current constant-voltage DC sources must be properly connected and disconnected, and the complexity is almost unrealizable in practice.

4) Serial large current plus parallel small current charging method: Because the above three charging method have problems, another charging method most suitable for a high-voltage battery pack especially an electric vehicle battery pack is developed, i.e. the battery management system and charger coordination and matching, serial large-current, constant-voltage current-limiting parallel small-current charging method is adopted. Although the charging method integrates the advantages of the above three charging method, all the defects of the three charging methods are completely carried on.

BRIEF SUMMARY OF THE INVENTION

A lithium ion power battery lossless charger adopts a charging method of overall serial constant current and monomer parallel connection constant voltage to realize lossless charging on batteries. Lossless includes two implications: one is that charging efficiency is close to 100%, and charging power is basically lossless; and the other one is that charging and discharging are completely based on the characteristic curve of the battery in FIG. 2, and the battery per se is completely free of damages in charging and discharging processes. The lossless charger spares a battery management system, all functions of a battery system, a charging system, a discharging system and a maintenance management system are realized only by a simple circuit, and no overcharge, overheating, over discharge, over current or short circuit occurs. The terminal voltages of all monomer batteries are completely equal when charging is finished, and no equalizing charging is required. Meanwhile, there aren't any complex control chips or software which are easy to be interfered, the charger is safe, reliable, simple and practical, and the cost, volume, weight and power consumption of the charger are all one tenth of those of the traditional charger.

Overall serial constant-current charging has the following implication: serial charging is adopted for overall batteries, and a constant-current constant-voltage DC source is adopted as a charging source. The monomer parallel constant-voltage control has the following implication: parallel voltage-stabilizing control is adopted for battery monomers, each monomer battery is directly connected with one parallel voltage-stabilizing circuit in parallel, and all parallel voltage-stabilizing circuits are directly connected in series. It can be understood that serial constant-current charging is carried out on all serial parallel sources while serial constant-current charging is carried out on the overall batteries. Whether the serial charging current flows across the batteries or the parallel voltage-stabilizing circuits depends on the terminal voltage of battery charging. The output voltage of the parallel voltage-stabilizing circuits is adjusted to the battery charging terminal voltage value 3.75V. When the terminal voltage of certain monomer battery connected with the parallel voltage-stabilizing circuits in parallel is charged to the voltage value, the parallel circuits are started, and the serial constant-current charging voltage flows across the parallel voltage-stabilizing circuits instead of the battery. The monomer battery stops charging, and other monomer batteries continue serial constant-current charging, as if two branches including directly and serially connected overall batteries and directly and serially connected parallel voltage-stabilizing circuits are simultaneously charged, only the charging moment is controlled by the parallel voltage-stabilizing circuits. Therefore, it is named as monomer parallel constant-voltage control. The overall serial constant-current charging and monomer parallel constant-voltage controlled charging method has all the advantages of serial and parallel charging, and all defects of serial and parallel charging are completely avoided. When charging is finished, the terminal voltages of all monomer batteries are equal to the set value 3.75V of the parallel voltage-stabilizing circuits connected with the monomer batteries in parallel, so that no over charge or overheating phenomenon occurs.

DETAILED DESCRIPTION OF EXEMPLARY EMBODIMENTS OF THE INVENTION

Figure 1:
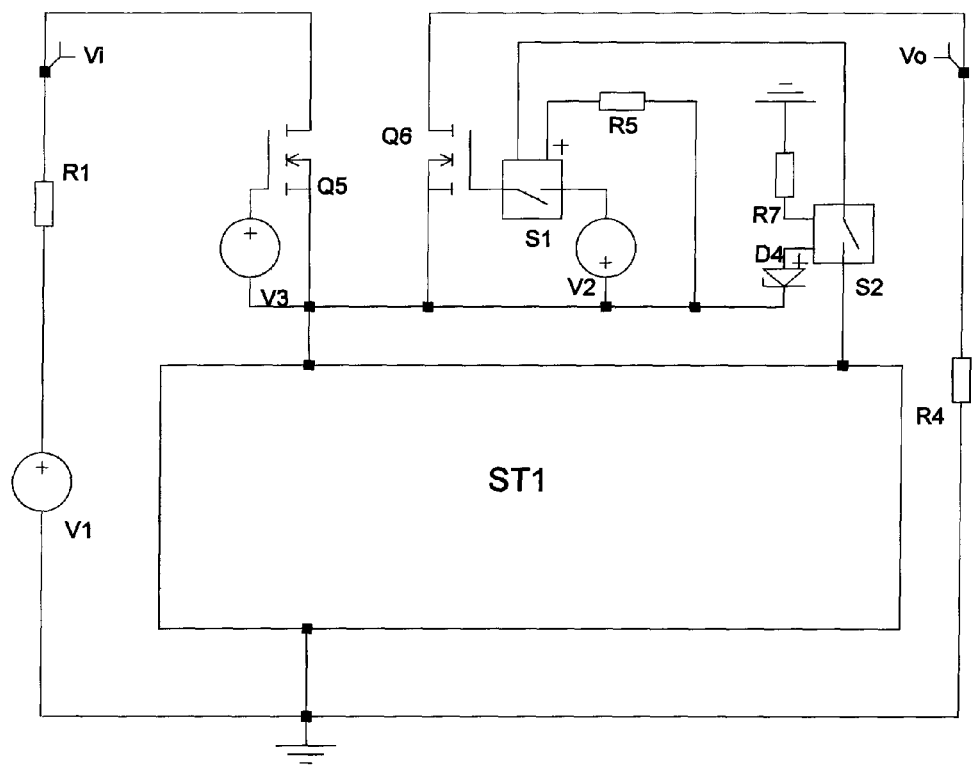
FIG. 1: Main Circuit Diagram

FIG. 1 refers to a lithium ion power battery lossless charger. The PWM control technology and high-frequency power conversion are not adopted. The whole machine comprises a charging circuit 1, a discharging circuit 2 and a battery control level 3 via cascading.

The charging circuit 1 comprises a MOS tube Q5, etc., the grid electrode of the MOS tube Q5 is connected with the positive electrode of a driving voltage V3, the source electrode is connected with the negative electrode of the driving voltage V3, the drain electrode is connected with a charging source V1 via a resistor R1, and the negative electrode of the charging source V1 is grounded.

The discharging circuit 2 comprises a MOS tube Q6, etc., the grid electrode of the MOS tube Q6 is connected with the negative electrode of a driving voltage V2 via a switch S1, the source electrode is connected with the positive electrode of the driving voltage V2, and the drain electrode is grounded via a resistor R4; the positive electrode of a switch S1 control side is connected with the positive electrode of the driving voltage V2 via a resistor R6, and the negative electrode is serially connected with a corresponding switch in the battery control level via a switch S2; and the positive electrode of a switch S2 control side is connected with the positive electrode of a Zener diode D4, the negative electrode is grounded via a resistor R7, and the negative electrode of the Zener diode D4 is connected with the source electrode of the MOS tube Q6.

The battery control level ST1 comprises one lithium ion power battery as well as one parallel voltage-stabilizing circuit Va and one switching circuit SW connected with the lithium ion power battery in parallel, the collecting electrodes of triodes Q1, Q2 in the parallel voltage-stabilizing circuit Va and the positive electrode of a Zener diode D1 are connected with the positive electrode of a battery E1, one end of a resistor R2 and the emitting electrode of the triode Q2 are connected with the negative electrode of the battery E1, the other end of the resistor R2 is connected with the negative electrode of the Zener diode D1 and the base electrode of the triode Q1, and the emitting electrode of the triode Q1 is connected with the base electrode of the triode Q2; and a switch S3 in the switching circuit SW is serially connected with corresponding switches in the previous and next battery control levels, the positive electrode of a switch S3 control side is connected with the positive electrode of a Zener diode D3, the negative electrode is connected with the negative electrode of the battery at the same level via the resistor R6, and the negative electrode of the Zener diode D3 is connected with the positive electrode of the battery at the same level.

The battery control level can be successively cascaded, the positive electrode of the battery at the first level is connected with the source electrode of the MOS tube Q5 in the charging circuit, the negative electrode is connected with the positive electrode of the battery in the next battery control level, the positive electrode of the battery at the second battery control level is connected with the negative electrode at the previous battery control level, the negative electrode is connected with the positive electrode of the next battery control level, and the negative electrode of the battery in the last level is grounded. The battery control level can be cascaded via 1-N levels in this cascading method.

Figure 2:
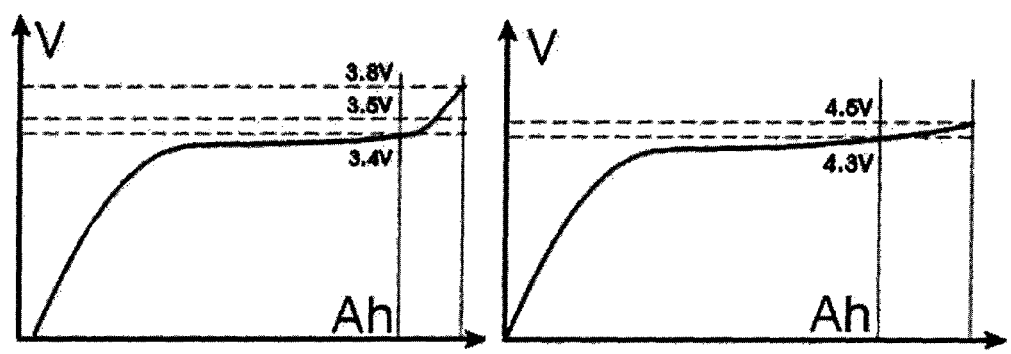
FIG. 2: Charging Characteristic Curve of Lithium Ion Power Battery

FIG. 2 is charging characteristic curve of the lithium ion power battery. The terminal voltage of the battery can be charged to 3.75V.

Figure 3:
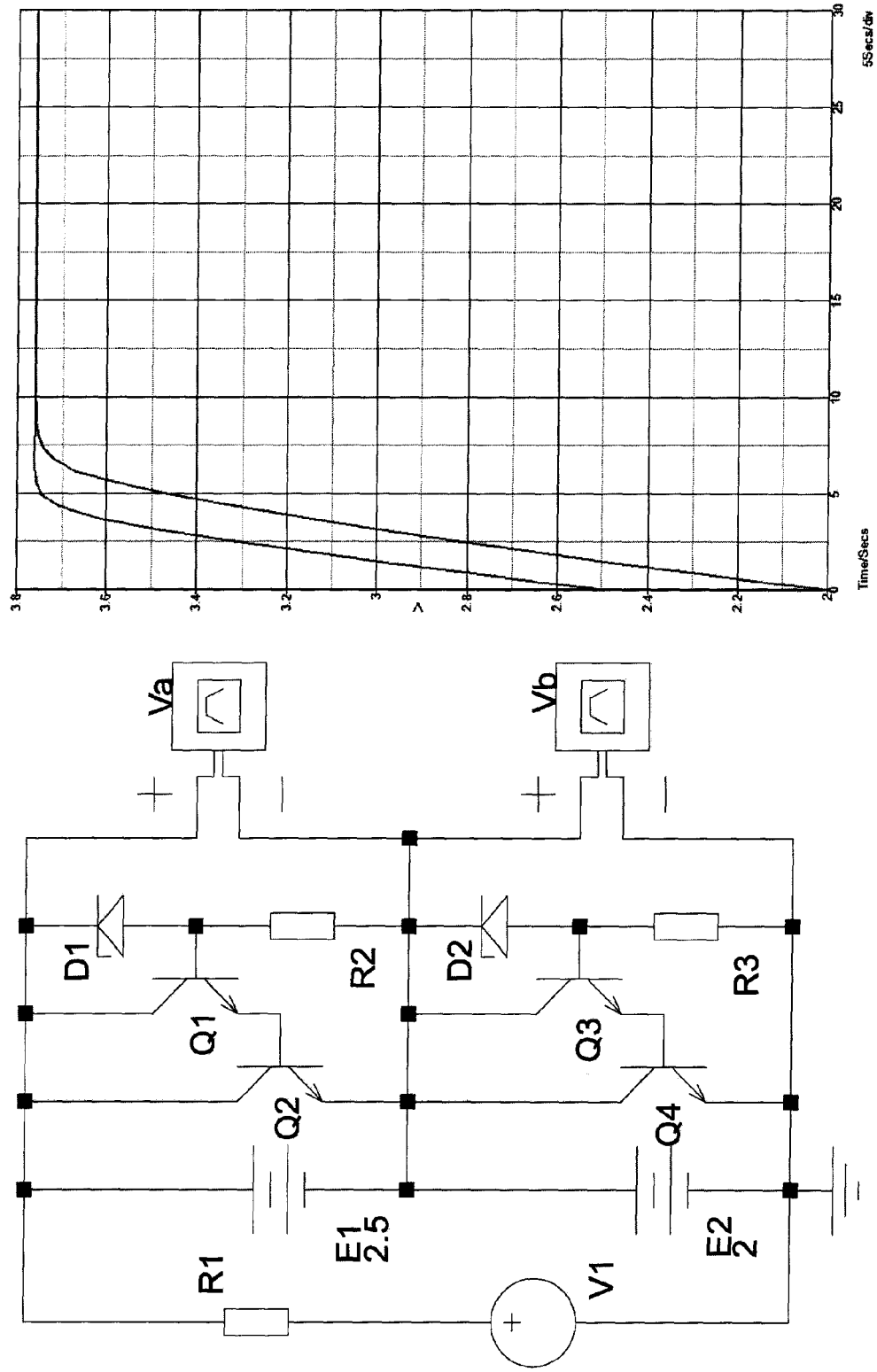
FIG. 3: Charging Circuit and Charging Curve Simulation Waveform of Lithium Ion Power Battery

The left part of FIG. 3 is the schematic circuit for the charging of the lossless charger, wherein E1=2.5V and E2=2.0V are monomer lithium ion batteries, V1 is DC constant-current constant-voltage source, two parallel voltage-stabilizing circuits Va and Vb are formed from Q1, Q2, D1, D2 and Q3, Q4, D2, R3 and are respectively connected with the batteries E1, E2 in parallel. V1 serially and directly charges the lithium ion batteries E1, E2 via the resistor R1. When the terminal voltage of one battery such as E1 is charged to the rated value, i.e. the set voltage-stabilizing value of the parallel voltage-stabilizing circuit Va is reached, the Zener diode D1 is broken down, the parallel voltage-stabilizing circuit Va is started, the serial charging current flows across the triode Q2, E1 is not charged any more, and the terminal voltage of E1 does not rise any more; and meanwhile, the serial charging current continues charging E2 until E2 is charged to the rated value, the charging source V2 is disconnected, and serial charging stops.

The right part of FIG. 3 is the charging voltage simulation waveform of lithium ion batteries E1, E2. E1 starts being charged from 2.5V. When the terminal voltage is charged to 3.75V, the charging curve becomes a straight line, the terminal voltage does not rise any more, E1 is the first to enter the full charging and parallel voltage-stabilizing state, and V1 continues charging E2. E2 starts being charged from 2.0V. When the terminal voltage is charged to the rated value, the charging curve also becomes a straight line and coincides with the charging curve of E1, because the initial charging voltage of E2 is low, the constant-current charging time is long, E2 is the second to enter the full charging and parallel voltage-stabilizing state.

Figure 4:
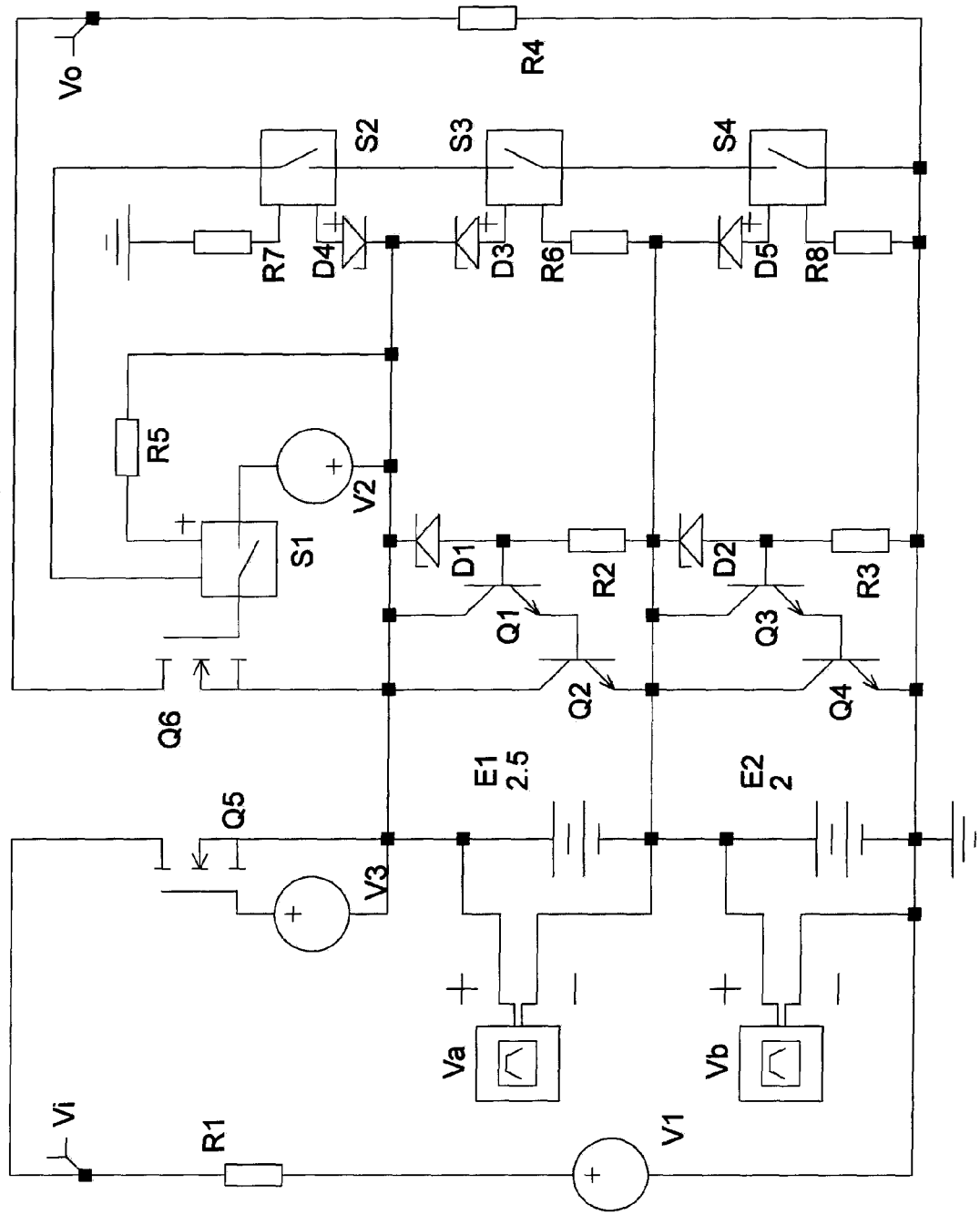
FIG. 4: Discharging Circuit of Lithium Ion Power Battery

FIG. 4 is the schematic circuit for the discharging (including charging) of the lossless charger. Q1 controls the on and off of the charging source V1, and Q2 controls the whole discharging process of the battery pack. The switches S3 and S4 together with D3, R6 and D5, R8 at the control side form two switching circuits SW1 and SW2, and the switching circuits SW1 and SW2 are respectively connected with the batteries E1, E2 in parallel. During the discharging process, the terminal voltages of E1, E2 are always greater than the breakdown voltages of D3, D5, and the switches S3, S4 are closed. Similarly, the control side (D4, R7) of the switch S2 and the entire battery pack are connected in parallel, during the discharging process, the terminal voltage of the entire battery pack is always greater than the breakdown voltage of D4, and the switch S2 is closed. The control side of the switch S1 is connected with the entire battery pack via a resistor R5 and the switches S2, S3, S4, the switch S1 is also closed, the driving voltage V2 is applied to the grid and source electrodes of Q2, Q2 is conducted, and the battery pack discharges toward a load R4.

During the discharging process, when the terminal voltage of one monomer battery in the battery pack such as E1 is lower than the rated discharging voltage, i.e. the terminal voltage is lower than the breakdown voltage of the Zener diode D3, the S3 control side loses power, S3 is disconnected, the S1 control side also loses power, S1 is disconnected, the driving voltage V2 is not applied to the grid electrode of Q2, Q2 is disconnected, and the discharging of the battery pack is finished. When over discharge, over current or external short circuit of the battery pack occurs, the terminal voltage of the battery pack is smaller than the breakdown voltage of D1, the S2 control side loses power, S2 is disconnected, the S1 control side also loses power, S1 is disconnected, the driving voltage V2 is not connected to the grid electrode of Q2, Q2 is disconnected, and the battery pack stops discharging. When the fault of over current or external short circuit is eliminated, the terminal voltage of the battery pack is restored to normal and is higher than the breakdown voltage of D4, the S2 control side acquires electricity, and S2 is closed. Meanwhile, if no over discharge occurs in the monomer batteries, S3, S4 are closed, S1 is also closed, V2 is connected to the grid and source electrodes of Q2, Q2 is conducted, and the battery continue discharge to the load.

The parallel voltage-stabilizing circuit Va and the switching SW1 connected with the monomer battery E1 form one basic unit. The basic unit can be freely cascaded to charge and discharge a battery pack formed from any quantity of lithium ion power monomer batteries.

Figure 5:
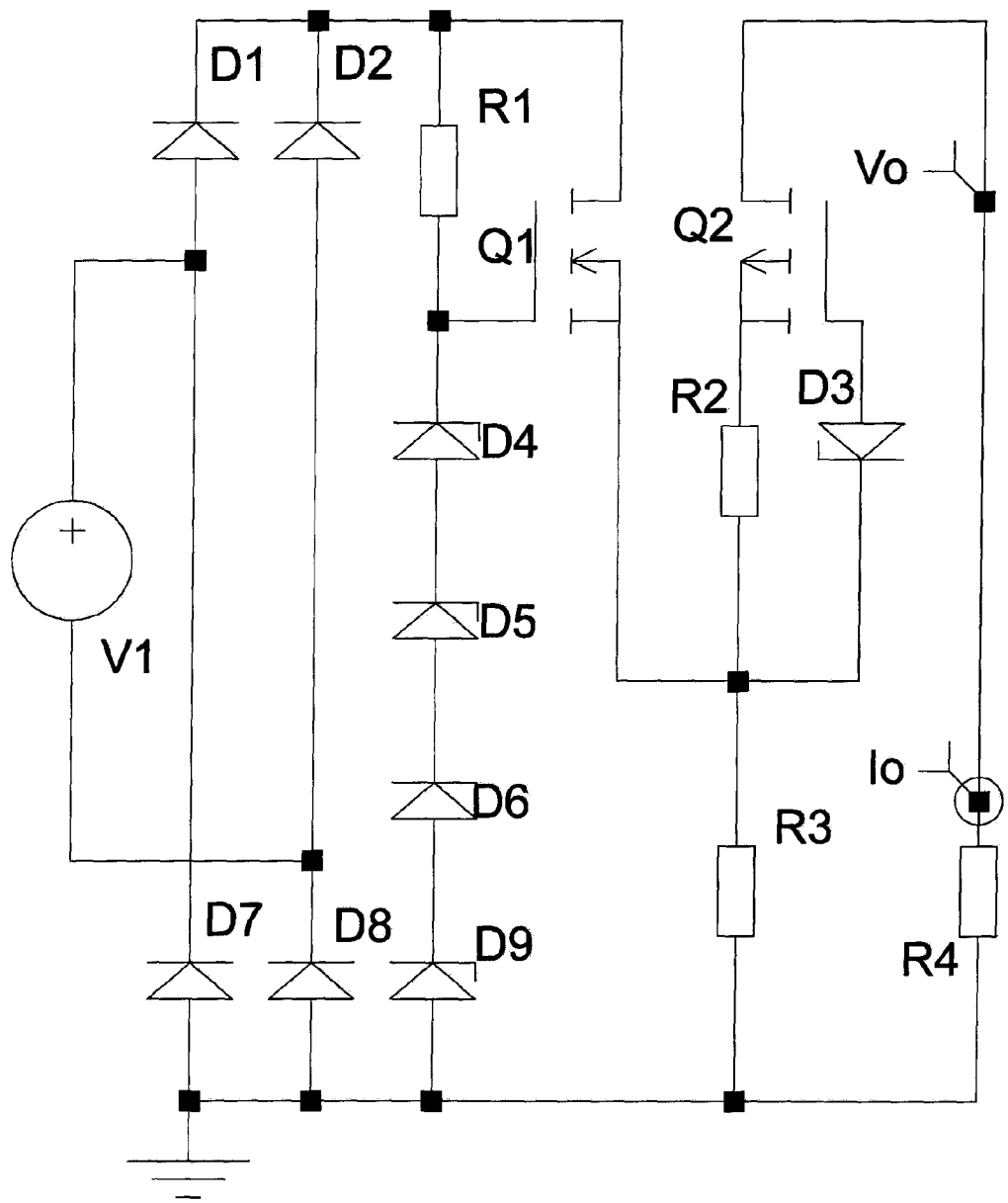
FIG. 5: Constant-Current Constant-Voltage Source
Figure 6:
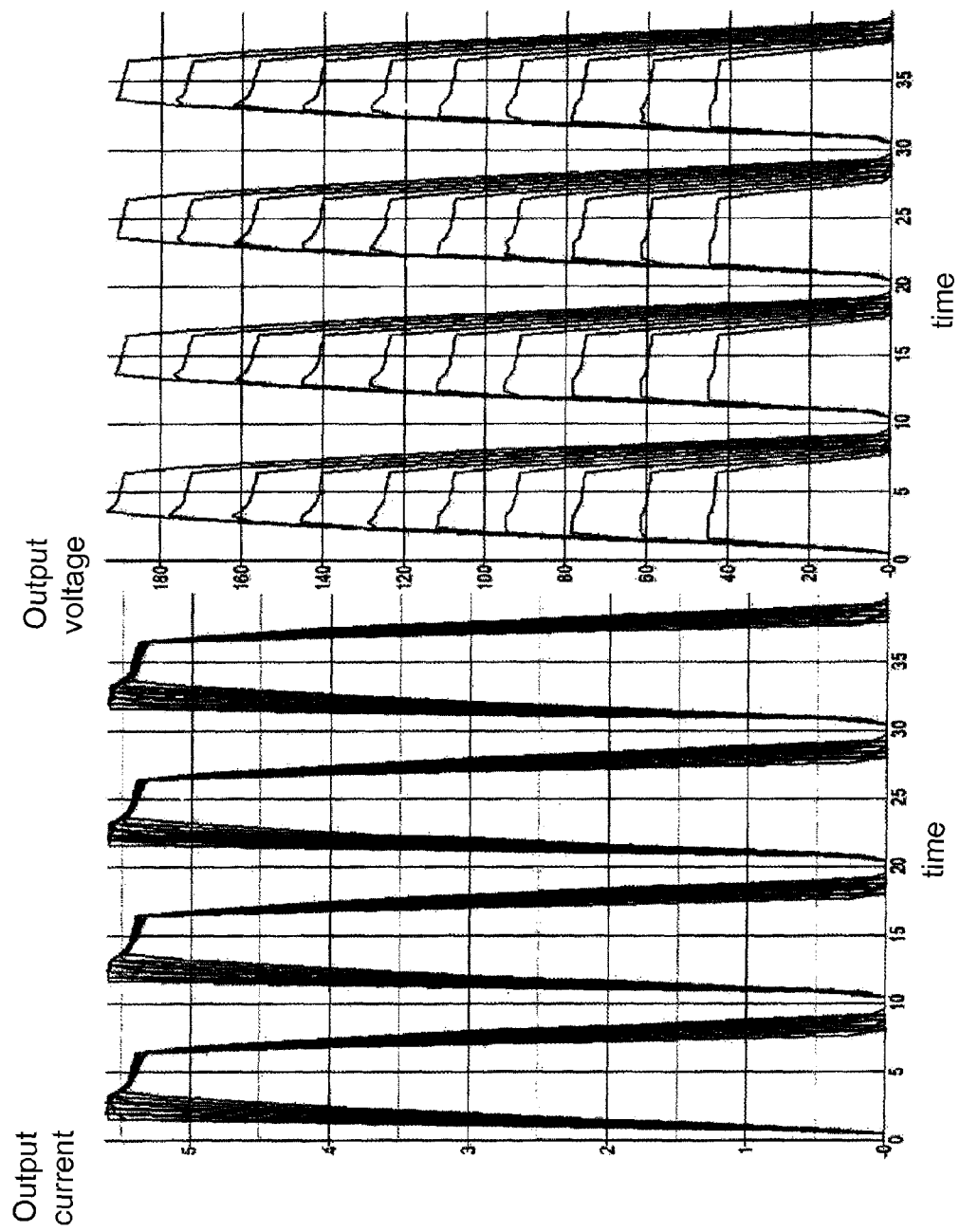
FIG. 6: Simulation Waveform of Constant-Current Constant-Voltage Source Output Voltage and Current

The charging source V1 in FIG. 3 is a constant-current constant-voltage source. FIG. 5 is the actual circuit of the constant-current constant-voltage source. Input voltage is rectified steamed bun wave. The left part of FIG. 6 is the output current simulation waveform of a load resistor R8, and the right part is the output voltage simulation waveform of the load resistor R8. The load resistor R8 is changed from 8 Ohm to 30 Ohm, the current flowing across the load resistor R8 is basically unchanged, and the voltage on the load resistor R8 is changed from 50V to 200V. The greater the load resistor is, the higher the output voltage is, which means the output current has the characteristics of constant current, but the voltage on the resistor R8 has one limit value, and the value is defined by the grid electrode voltage of the MOS tube Q1, namely the breakdown voltages of four Zener diodes D4, D5, D6, D9. During the entire charging process, the highest voltage of the lithium ion battery pack will never exceed the defined value, so that charging is safe and reliable.

Figure 7:
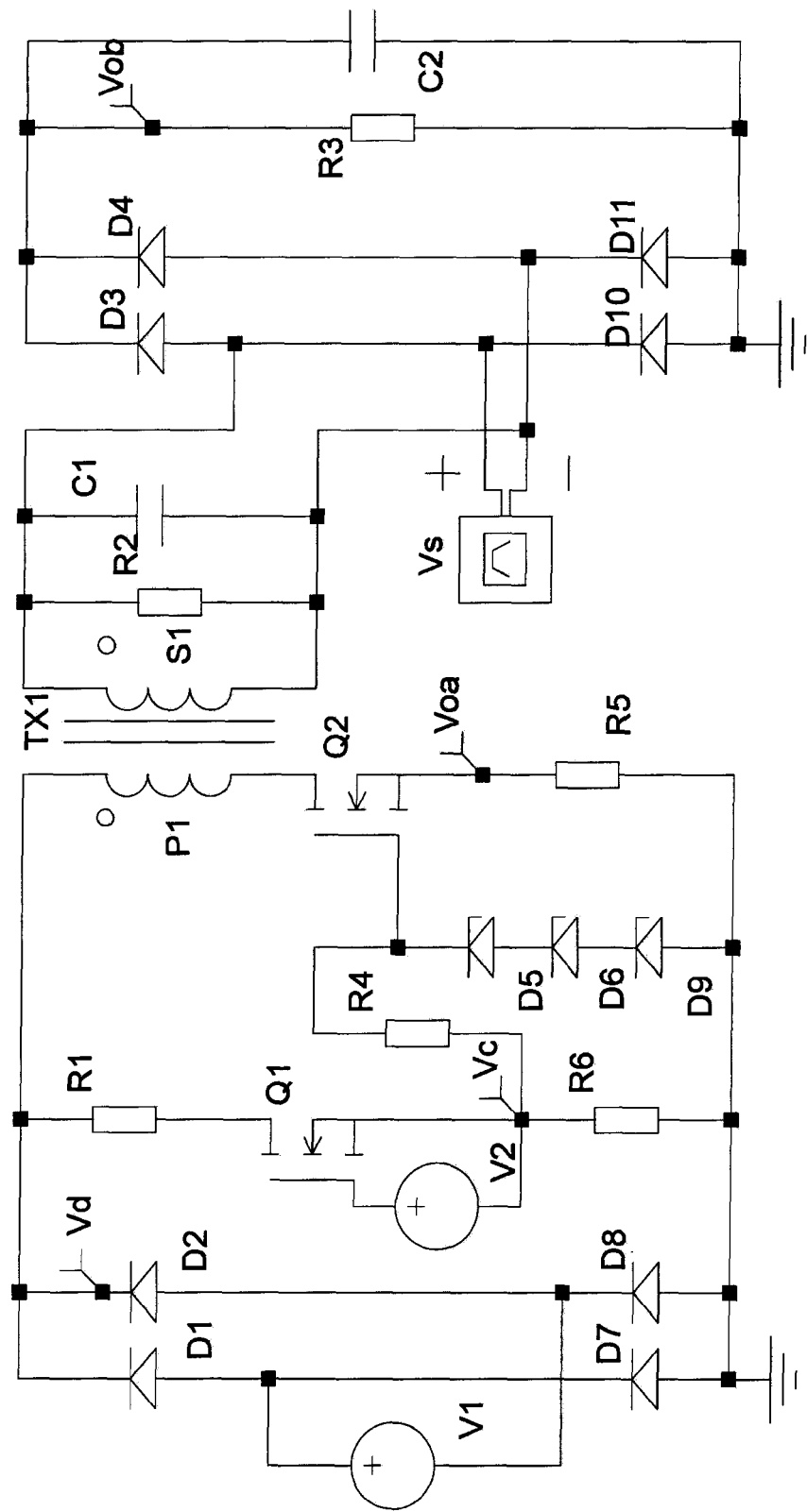
FIG. 7: Voltage Cutting Circuit
Figure 8:
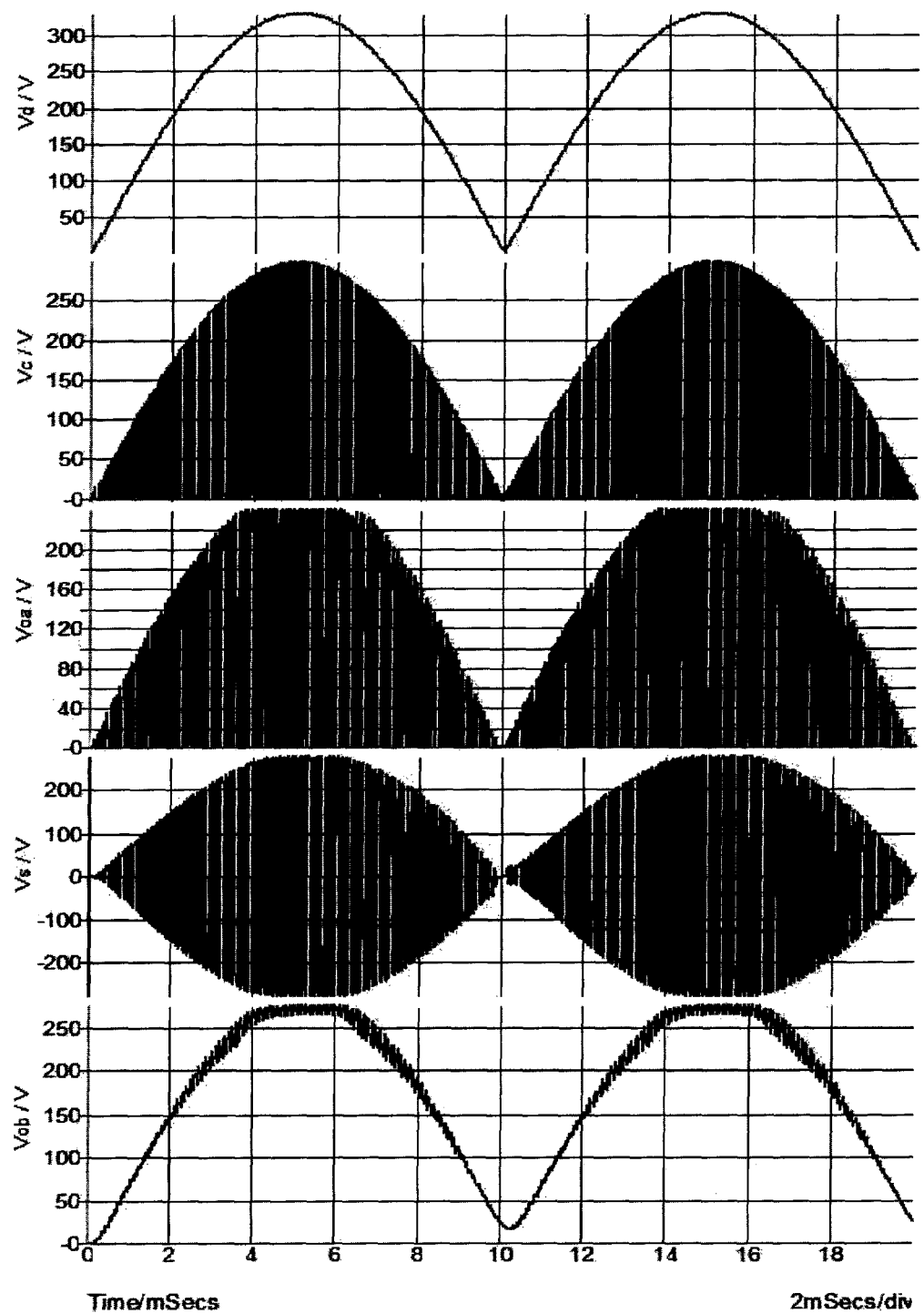
FIG. 8: Simulation Waveform of Voltage at Each Point of Voltage Cutting Circuit

The field-effect tube Q1 in FIG. 3 controls the connection and disconnection of the charging source V1 to carry out constant-current serial charging on the battery pack. Meanwhile, constant-voltage parallel control is carried out on the monomer batteries. During overall serial constant-current charging and monomer parallel constant-voltage control process, the output voltage of the constant-current source V1 is varying and depends on the terminal voltage of each monomer battery in charging, and the variation is reflected on the resistor R1. When the voltage of the battery pack is low, the voltage on the resistor R1 is high, otherwise the voltage of the resistor R1 is low, and the voltage drop on the resistor R1 is lost due to heating. In order to improve charging efficiency, the part of power is fed back through power conversion. The voltage cutting circuit in FIG. 7 has the function: a transformer TX1 is connected with the drain electrode of the MOS tube Q2, a square-wave driving signal namely voltage cutting signal is applied to the grid electrode of Q2, a stable DC output voltage Voa can be obtained at the source electrode, and a feedback voltage Vob is obtained at the transformer secondary side. FIG. 8 is the output voltage simulation waveform of the voltage cutting circuit: from top to bottom: input steamed bud wave voltage Vd, square-wave driving signal Vc enveloped to sine wave, grid electrode output voltage Voa, double-sideband voltage Vs with transformer secondary side enveloped to sine wave and transformer output voltage Vob. The constant-current constant-voltage source and the voltage cutting circuit belong to the prior art (Bystronic Power Converter; Application No.: 201010130192X; Specific Embodiments: 10, 19), and detailed description is omitted.

Example 1

Lithium Ion Power Battery Lossless Charger for an Electric Vehicle

Figure 9:
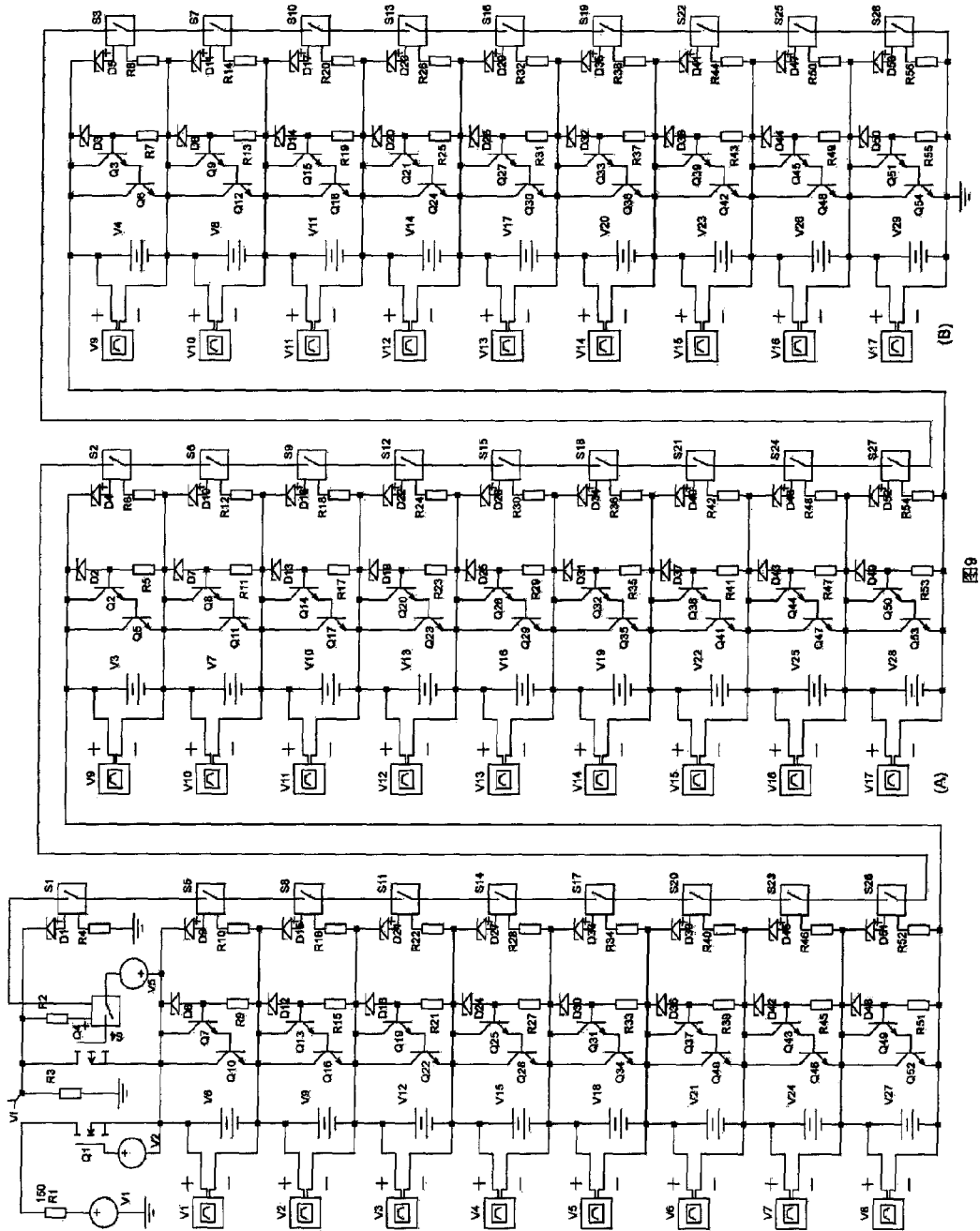
FIG. 9: Actual Charging and Discharging Circuit of 26 Lithium Ion Monomer Batteries
Figure 10:
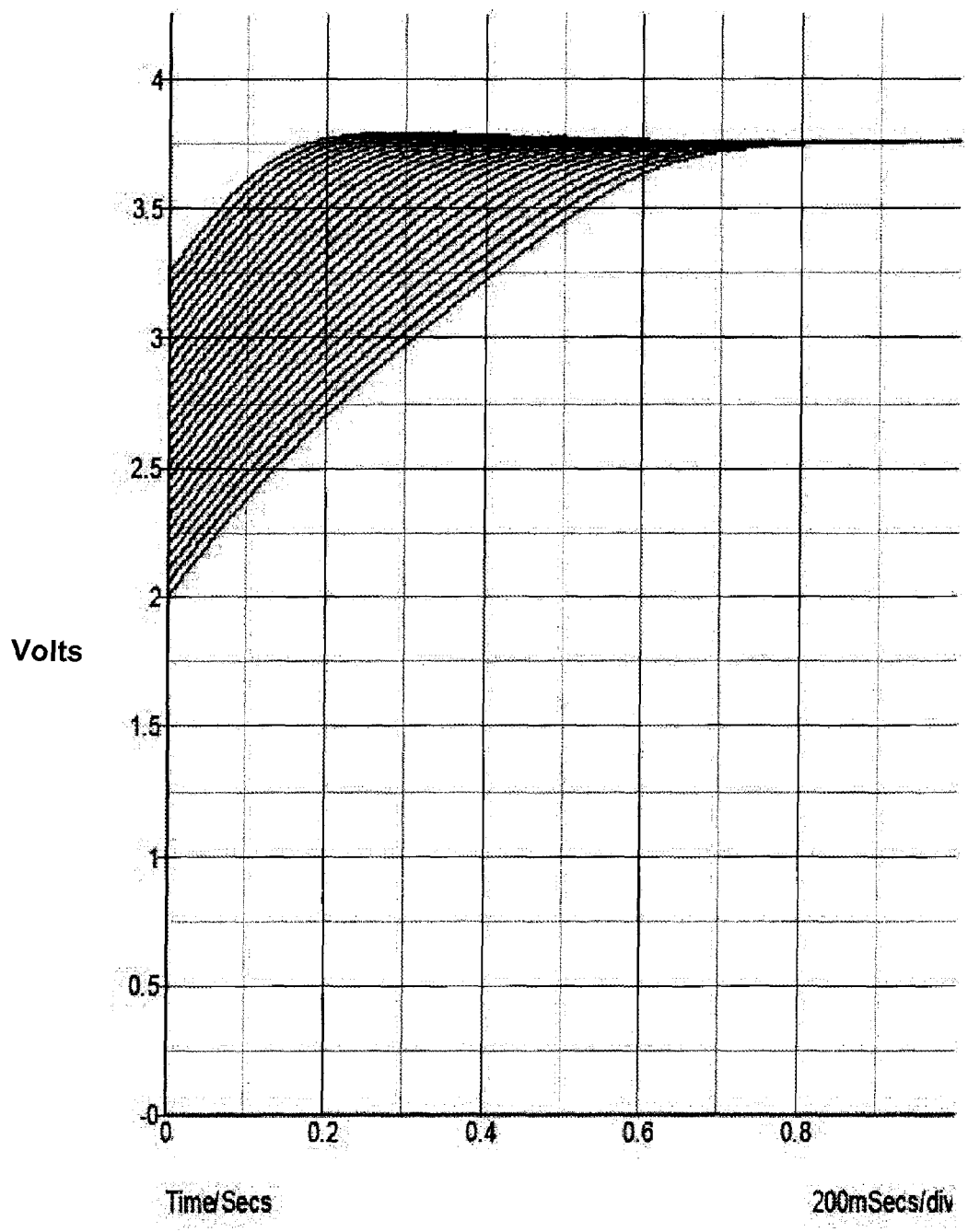
FIG. 10: Charging Curve Simulation Waveform of 26 Lithium Ion Monomer Batteries

When the electric vehicle is driven by a DC motor, the required terminal voltage of the battery pack is 96V. FIG. 9 is the actual charging circuit of the 96V lithium ion power battery pack of the electric vehicle. The 96V lithium ion power battery pack is formed by cascading 26 completely identical circuits. FIG. 10 is the simulation waveform of the charging curve. The quantity of monomer batteries is 26, and the terminal voltage is 3.7V. During charging, the terminal voltage of 26 monomer batteries is changed from 2V to 3.3V, with a difference of 0.05V in proper order. When charging is finished, the terminal voltages of all monomer batteries are completely identical and are equal to the setting value 3.75V of the output voltage of the parallel voltage-stabilizing circuit connected with each monomer battery in parallel. The terminal voltages of the monomer batteries at end of charging are equal to the setting value of the output voltage of the parallel voltage-stabilizing circuit connected with the monomer batteries in parallel. The setting value can be manually adjusted, so that the terminal voltages of the monomer batteries at end of charging can be manually controlled.

Figure 11:
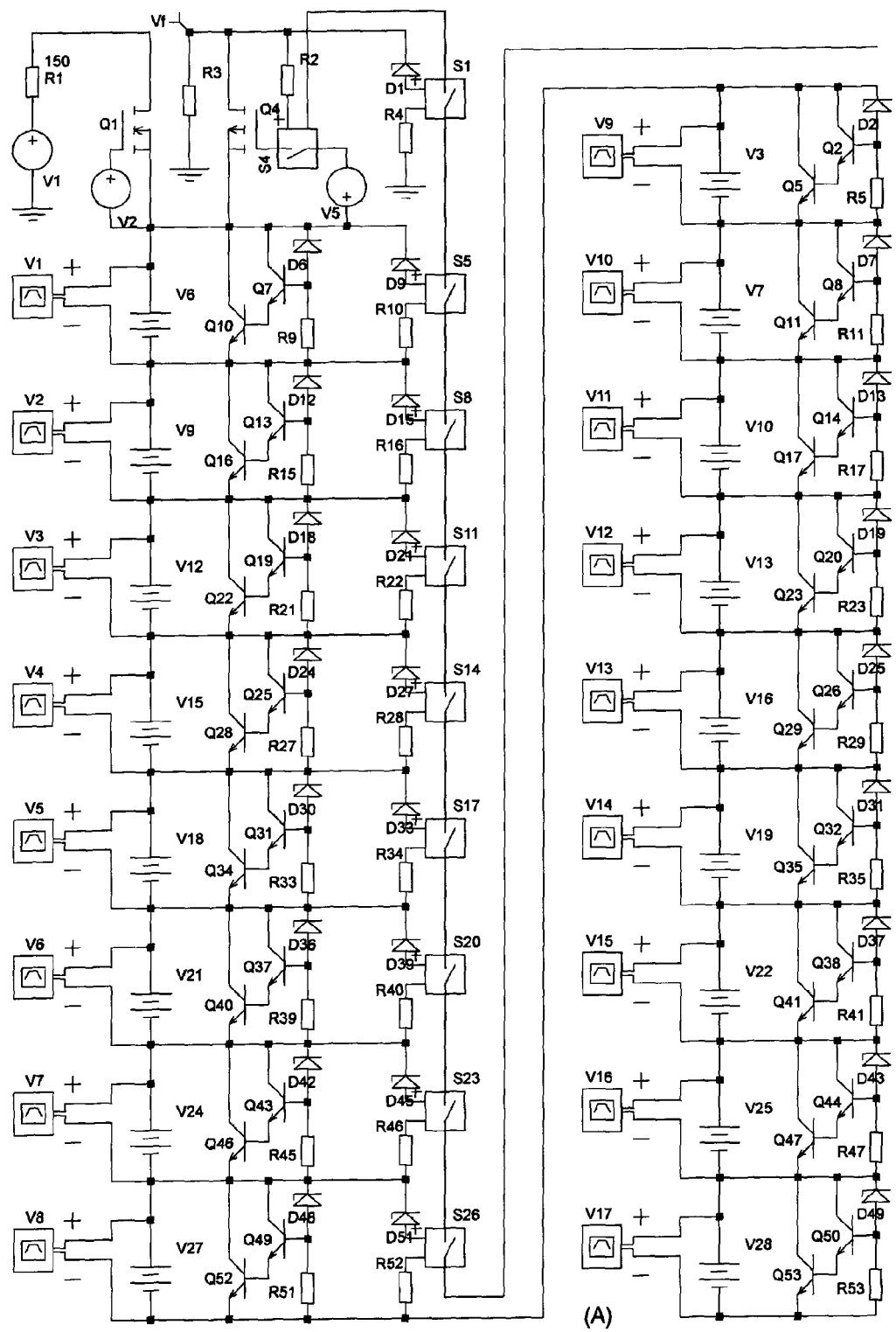
FIG. 11: Part A of Charging and Discharging Circuit of 26 Lithium Ion Monomer Batteries
Figure 12:
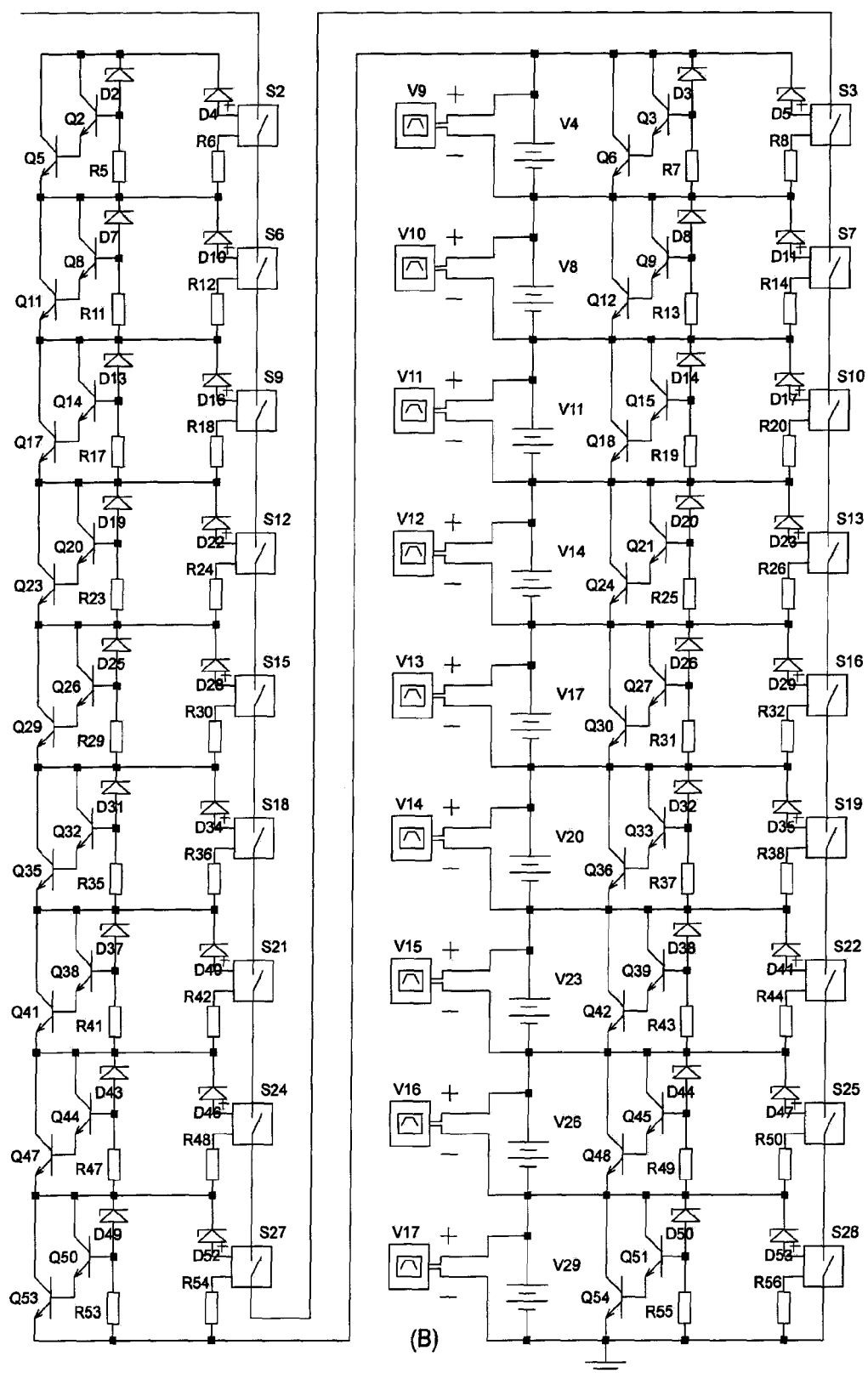
FIG. 12: Part B of Charging and Discharging Circuit of 26 Lithium Ion Monomer Batteries

FIG. 11 and FIG. 12 are amplified circuit diagrams of two parts (A) and (B) of the circuit of FIG. 10.

The electric vehicle is driven by a three-phase motor, the terminal voltage of the lithium ion power battery pack is 288V, 78 monomer batteries of 3.7V are required to be serially connected, and the charging circuit comprises 78 completely identical circuits via cascading. The on-off operation without a large-current high-voltage switch is very easy to realize, and the simulation waves of the specific circuit and the charging curve are identical to those of 96V charging.

Example 2

Lead-Acid Battery Lossless Charger

The charging circuit is identical to that of specific embodiment 1. The differences are as follows:
1) The breakdown voltage of the Zener diode in the parallel voltage-stabilizing circuit is corresponding to the terminal voltage 12V of the lead-acid storage.
2) The serial constant-current charging current is corresponding to the charging characteristic curve of the lead-acid battery.
3) The serial constant-voltage charging voltage is corresponding to the terminal circuit of the lead-acid battery pack.

Figure 13:
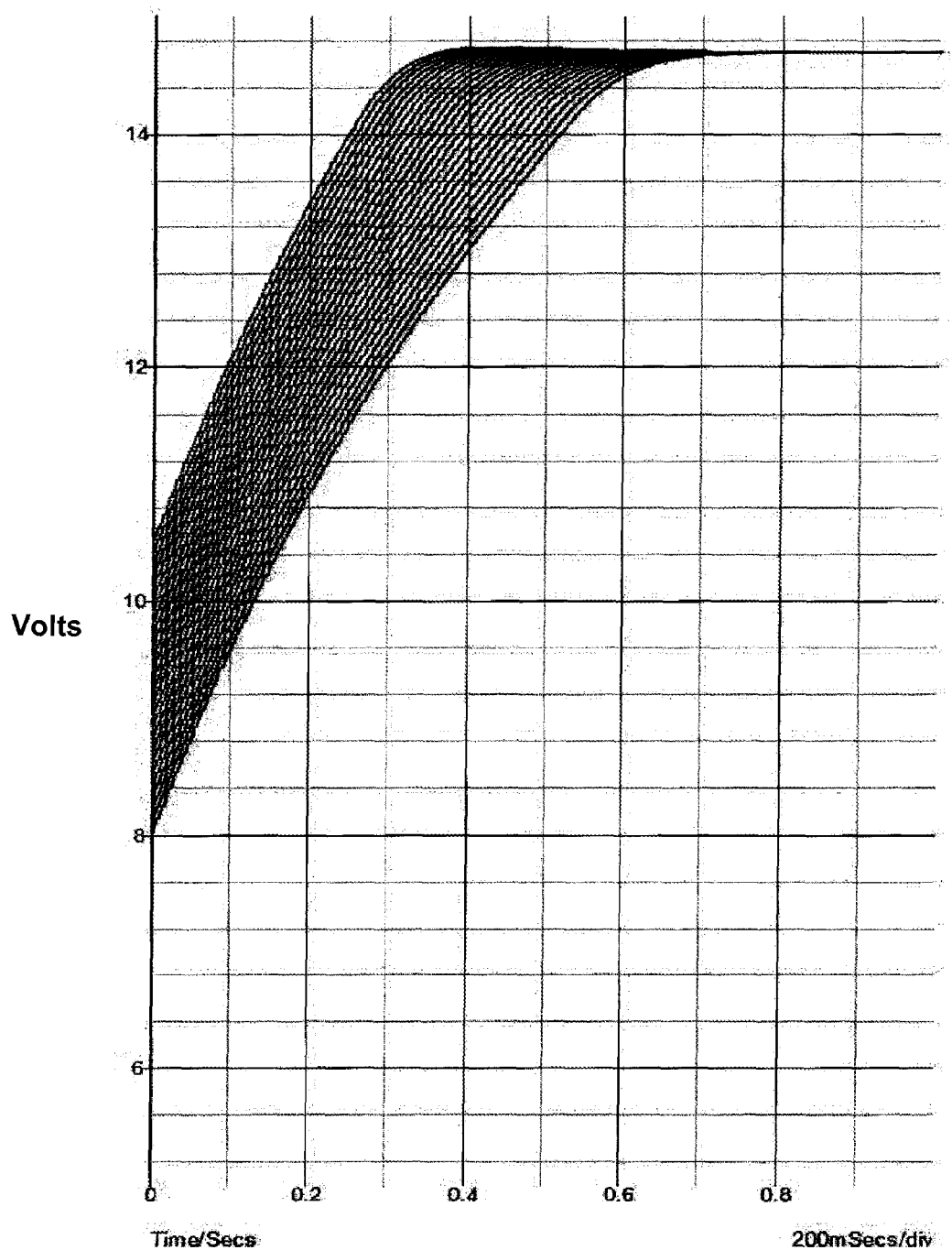
FIG. 13: Charging Curve Simulation Waveform of 26 Lead-Acid Batteries

FIG. 13 is the simulation waveform of the charging curve of the lead-acid battery lossless charger. It can be seen that when charging is started as the terminal voltages of the batteries are varying from 8V to 10.6V, the monomer batteries with high terminal voltage are the first to reach the charging end value, and the charging curve becomes a straight line and is maintained to last. The monomer batteries with low terminal voltage are the last to reach the charging end value. The monomer batteries reach the charging end value and maintain the value to the last no matter lowest terminal voltage or highest terminal voltage or any terminal voltage between them.

The practical application of parallel charging is almost unrealizable, and the effect is within sight but beyond reach, equalized charging must has dedicated circuits, and the battery charge ability is reduced while the power consumption and cost are increased. The lossless charger adopts simple serial charging. Not only is the effect of parallel charging reached, but also the charge ability of equalized charging is reached. Not only is the charge ability of the batteries is not reduced but greatly improved.

Comments
1) The lossless charger adopts overall serial constant-current and monomer parallel constant-voltage charging method to realize lossless charging lithium ion power batteries. Actually serial charging is carried out, but the effect of parallel charging is generated. No overcharge or overheating occurs in the whole charging process, and no equalized charging is required.
2) The lossless charger simultaneously comprises a discharging circuit. A weak-current small switch replaces the on and off of a large-current high-voltage switch so that the discharging circuit is safe and reliable. When over discharge, over current or external short circuit occurs, the lithium ion power batteries are cut off in a non-delay way.
3) The circuit of the lossless charger is simple, the battery management system and various complex control chips and software are spared, and the performances of charging and discharging are greatly improved.
4) The lossless charger adopts the constant-current constant-voltage source and the voltage cutting circuit in the Bystronic power converter for serial charging, so that the charging efficiency is close to 100%.
5) The terminal voltages of the monomer batteries at end of charging are equal to the setting value of the output voltage of the parallel voltage-stabilizing source connected with the monomer batteries in parallel. The setting value can be manually adjusted, so that the lossless charger is applicable to charge and discharge various batteries with any terminal voltage.
6) The circuit diagrams in the article all come from power electronics simulation software SIMetrix/SIMPLIS 5.60, and identical output waveform can be obtained through direct simulation without modification.

What is claimed is:

1. A lithium ion power battery charger, comprising:
a charging circuit, said charging circuit comprising a first MOS tube with a grid electrode, source electrode, and drain electrode, wherein the grid electrode is connected with the positive electrode of a driving voltage, the source electrode is connected with the negative electrode of the driving voltage, and the drain electrode is connected with a charging source through a first resistor;
a discharging circuit; and
a battery control level.

2. The lithium ion power battery charger of claim 1, further wherein the negative electrode of the charging source is grounded.

3. The lithium ion power battery charger of claim 1, further where the discharging circuit comprises:
a second MOS tube with a grid electrode, source electrode, and drain electrode, wherein the grid electrode is connected with the negative electrode of a second driving voltage through a first switch, the source electrode is connected with the positive electrode of the second driving voltage and the negative electrode of a Zener diode, and the drain electrode is grounded through a second resistor.

4. The lithium ion power battery charger of claim 1, further wherein said battery control level comprises:
   a parallel voltage-stabilizing circuit; and
   a switching circuit.

5. The lithium ion power battery charger of claim 4, wherein the battery control level can be successively cascaded.

* * * * *